INVENTORS
Daniel R. Brosious
James K. Hollingshead

INVENTORS
Daniel R. Brosious
James K. Hollingshead

United States Patent Office 3,422,272
Patented Jan. 14, 1969

3,422,272
PINHOLE DETECTORS
Daniel R. Brosious, Bethlehem, and James K. Hollingshead, Hellertown, Pa., assignors to Bethlehem Steel Corporation, a corporation of Delaware
Filed June 2, 1965, Ser. No. 460,669
U.S. Cl. 250—219                                8 Claims
Int. Cl. G01n 21/30; G01n 21/00; G01j 3/00

ABSTRACT OF THE DISCLOSURE

A C-shaped pinhole detector is provided with an upper and a lower light shield positioned adjacent each edge of a moving strip. The shields at each edge are adapted to be synchronously driven, in response to light impinging upon a light-sensitive device positioned on the lower shield, whereby a constant position is maintained between the shields and the edge of the strip. A flexible film of light-absorbing material is connected to each shield and blocks light from the source which extends outwardly of the shield. A plurality of photoluminescent louvers provides a source of secondary radiation which is utilized to actuate said light-sensitive means.

This invention relates to apparatus for detecting light transmission through moving strip, and more particularly to pinhole detectors.

Steel strip, particularly if it is subsequently to be coated with another metal, e.g. tin, is inspected for pinholes prior to the coating operation. The strip is accepted or rejected by the customer on the basis of the number of pinholes detected per unit area of material inspected, and can be used in less critical applications if said number of pinholes is greater than that which is acceptable to the tinplate customer.

Inspection is accomplished by means of a pinhole detector, which comprises a housing having an upper chamber containing a source of light and a lower chamber containing light-sensitive means, said chambers having confronting slotted apertures extending transverse to the direction of strip travel. Inasmuch as light passing around an edge of the strip and entering the lower chamber would result in false pinhole indications, light-shielding means is provided adjacent each edge of the strip.

Prior pinhole detectors were constructed in a manner such that the strip to be inspected had to be threaded through the detector prior to inspection. The reason for this was that a light-shielding means and its associated mechanical and electrical components were housed adjacent each edge of the strip. This construction precluded inserting or removing a detector from a threaded line, thus severely limiting the versatility of the detector.

In recent years, light-shielding means have been of the movable, non-contacting type. Such light-shielding means are provided with sensing means for detecting an edge of the strip. Control circuits and motive power means cooperate with said sensing means to maintain the position of the inner edges of said light-shielding means constant with respect to the edge of the strip.

In general, these light-shielding means comprised a forward section, having a narrow, shallow throat, attached to a relatively long tail plate covering that portion of the aperture in the lower chamber disposed outwardly of the forward section. Because of this construction, the probability of an edge of the strip striking a shielding means was unduly high and the response of said light-shielding means to lateral variations of the edge of the strip was less than optimum. In addition, the detector had to be quite long in order to accommodate the relatively long tail plates.

It is an object of this invention to provide a pinhole detector adapted to be inserted into, or removed from, a threaded strip line.

It is a further object to provide a compact, highly-responsive light-shielding means having a relatively wide and deep throat.

We have discovered that the foregoing objects can be attained by providing a pinhole detector with light-shielding means comprising a first shield mounted in the upper chamber and a second shield mounted in the lower chamber, each shield being connected to a flexible film of non-light transmitting material extending outwardly of the shield. Such light-shielding means may be mounted in a detector having a substantially C-shaped housing.

Referring to the drawings:

FIGURE 5 is a plan view, partly in section, showing details of the apparatus adjacent one edge of the strip, while FIGURE 5A is a similar view of the apparatus adjacent the other edge of the strip.

Figure 1:
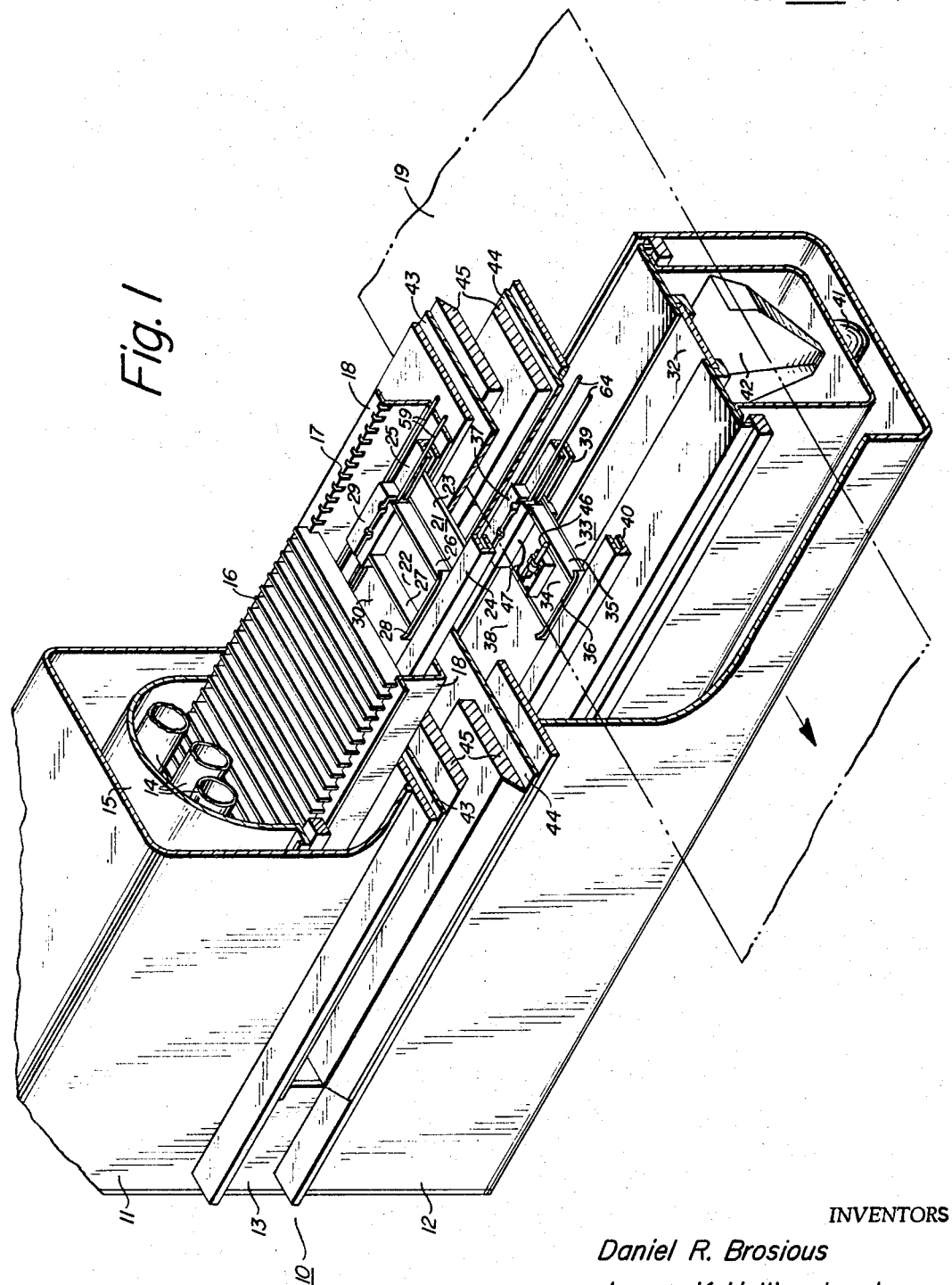
FIGURE 1 is a perspective view, partly in section, of a portion of a pinhole detector constructed in accordance with the invention.
Figure 2:
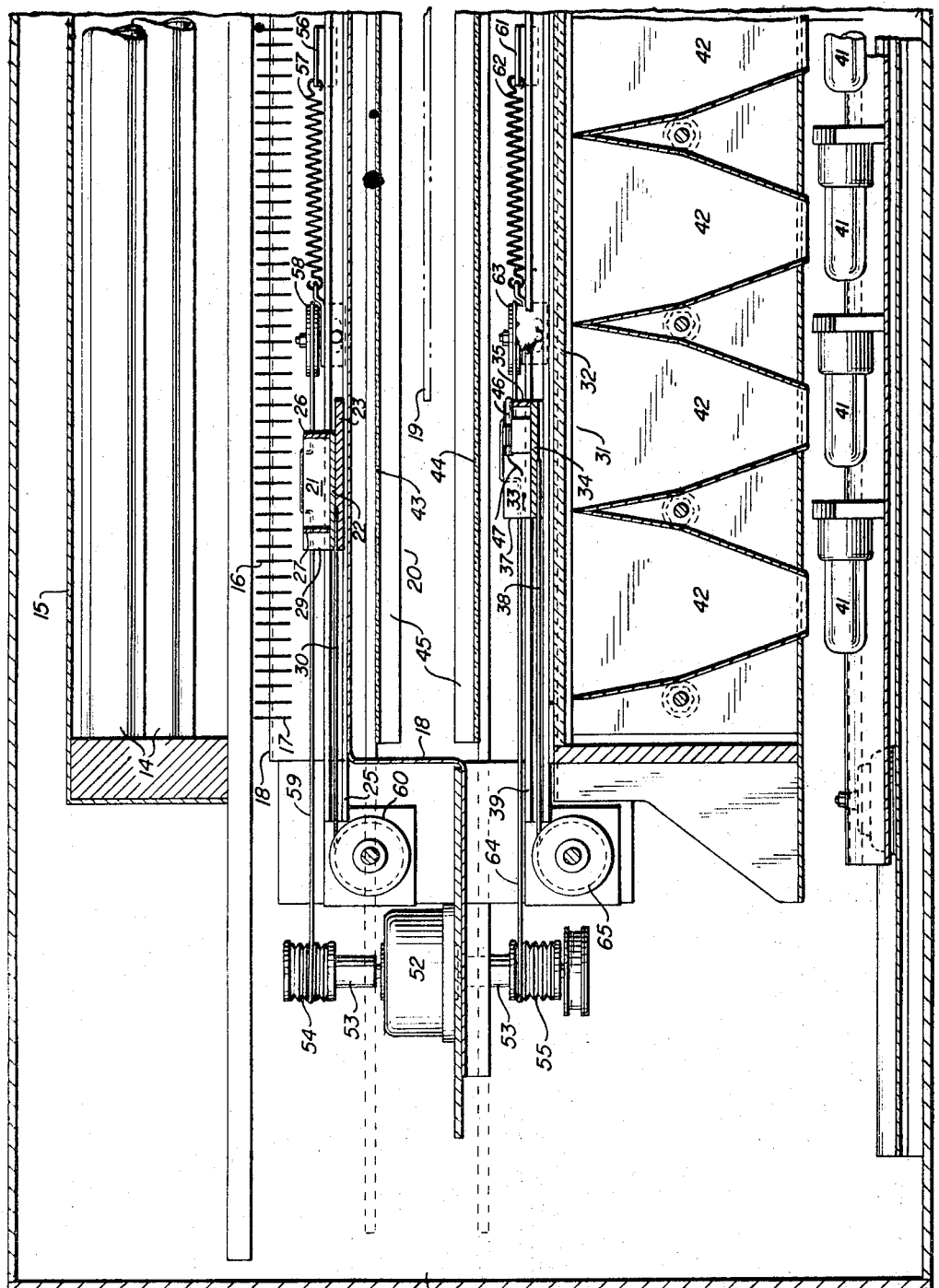
FIGURES 2 and 3 are side elevation sectional views of the apparatus shown in FIGURE 1.

Referring more particularly to FIGURE 1, a pinhole detector is shown as comprising a substantially C-shaped housing 10 comprising an upper chamber 11, a lower chamber 12, and a supporting member 13 interconnecting said chambers at one end thereof, the other end of the housing being open. The upper chamber contains a source of light within a first frequency range, for example fluorescent tubes 14, which emit substantially monochromatic ultraviolet light having a wavelength between about 3000 and 4000 Angstroms. Said source is provided with an integrating light reflector 15. Mounted directly below the source is a plurality of parallel, equidistantly spaced, photoluminescent louvers 16 disposed in a plane perpendicular to the surface of the strip and parallel to the direction of strip travel. The louvers are mounted in slots 17 in brackets 18 extending along the length of the upper chamber.

The louvers are rendered photoluminescent by covering the surfaces thereof with either a paint or a tape having photoluminescent properties. Each louver absorbs substantially all incident ultraviolet light and, in response to said absorbed light, emits light within a second frequency range, e.g. light having a wavelength between about 5600 and 8000 Angstroms. Thus, only ultraviolet light from the source which enters the plurality of louvers 16 in planes perpendicular to the surface of the strip 19 and parallel to the direction of strip travel passes through the louvers. Incident ultraviolet light, i.e. ultraviolet light from the source which enters the plurality of louvers 16 in other planes, and thus impinges upon the louvers, emerges therefrom as light within said second frequency range.

Figure 4:
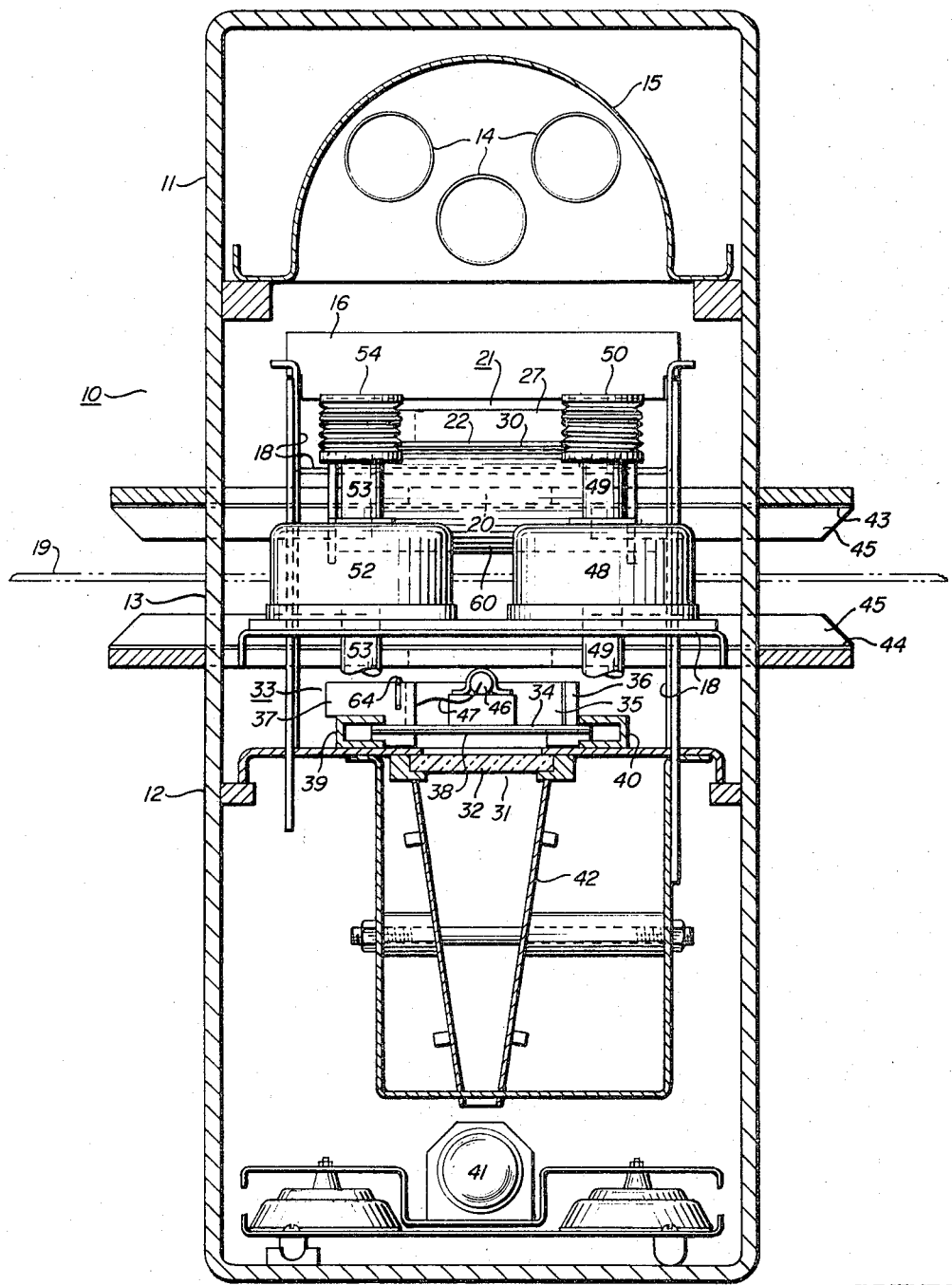
FIGURE 4 is an end elevation sectional view of said apparatus.
Figure 5:
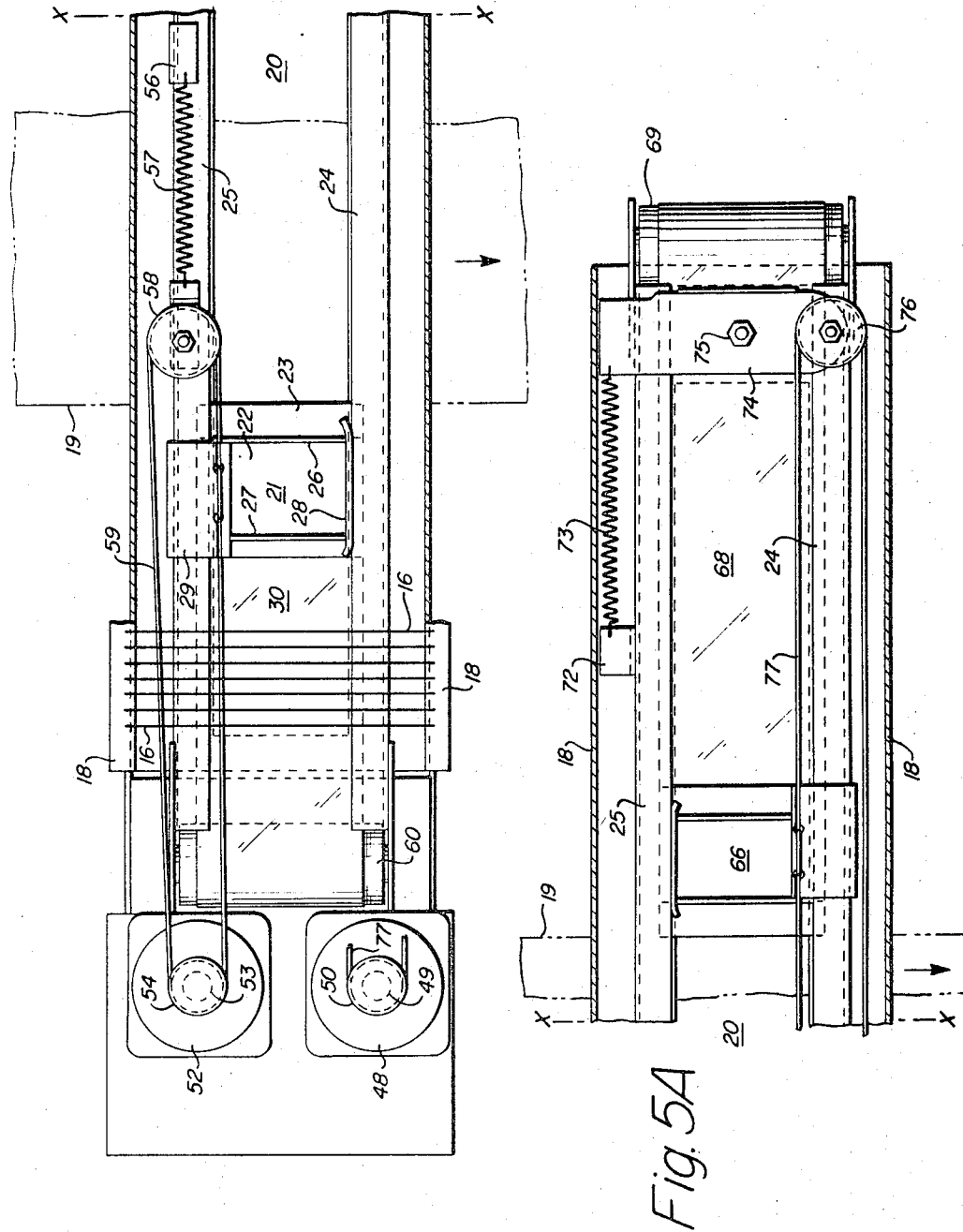

As is shown in FIGURES 4, 5, and 5A, the upper chamber 11 is provided with a slotted aperture 20 extending transverse to the direction of strip travel. Interposed between said louvers and said aperture, and positioned adjacent each edge of the strip, is a first shield 21 adapted to prevent transmission of light from the source. Said shield is disposed across a portion of aperture 20 and comprises a filter plate 22 which transmits only light having a wavelength longer than about 5800 Angstroms. The forward edge of plate 22 is connected to a plate 23 coated with a light-absorbing material. The upper chamber is provided with slotted guides 24 and 25 coextensive with aperture 20. The side edges of plates 22 and 23 are disposed in the slots of said guides.

The shield 21 is provided with forward and rear walls 26 and 27, respectively, which also may be coated with said photoluminescent material. A guide plate 28 and a guide block 29 are also provided. A flexible film 30 of non-light-transmitting material is connected to the shield 21 and is disposed across that portion of aperture 20 extending outwardly of the shield 21, i.e. away from the strip 19.

The lower chamber 12 contains a slotted aperture 31 confronting aperture 20. Disposed across aperture 31 along the entire length thereof is an ultraviolet-transmitting filter 32 which transmits substantially only light having a wavelength between about 3000 and 4000 Angstroms.

Disposed directly above the filter 32 is a second shield 33 adapted to prevent light transmissions therethrough. The shield 33 comprises a rectangular plate 34, a forward wall 35, a guide plate 36, and a guide block 37. A flexible film 38 of non-light-transmitting material is disposed across that portion of aperture 31 extending outwardly of the shield 33, i.e. away from the strip 19. The lower chamber 12 is provided with slotted guides 39 and 40 coextensive with aperture 31. The side edges of plate 34 are disposed in the slots of said guides.

Disposed within the chamber 12 is first light-sensitive means comprising a plurality of photomultiplier tubes 41 connected to standard circuits for registering pinholes. Preferably, means is interposed between each tube 41 and the filter 32 which directs light entering the chamber 12 in directions substantially perpendicular to the surface of the strip 19 toward a photomultiplier tube, while light which enters the chamber 12 in directions substantially nonperpendicular to the surface of the strip 19 is reflected out of the chamber 12. This means comprises at least four, and preferably six, plane reflective surfaces forming a light funnel 42. Said light funnels permit the sensitivity of the pinhole detector to be increased whereby one mil holes can easily be detected.

The upper and lower chambers are sealed with sheets of transparent material 43 and 44, respectively. Rub rails 45 are provided.

The first and second shields and their associated flexible film form a light-shielding means which prevents light within said first frequency range from passing around an edge of the strip. Inasmuch as the strip may vary laterally during inspection, means is provided for maintaining the position of the inner edges of the shields constant with respect to an edge of the strip.

Mounted on the shield 33 is second light-sensitive means comprising a photoresistive cell 46. The resistance of the cell 46, which is characterized by extreme sensitivity to light having a wavelength between about 7000 and 7500 Angstroms, varies inversely with the intensity of the infrared light which impinges upon it. The cell is included in a motor control circuit, shown in detail in FIGURE 6, and is connected to the other components thereof by a flexible conductor 47.

Figure 3:
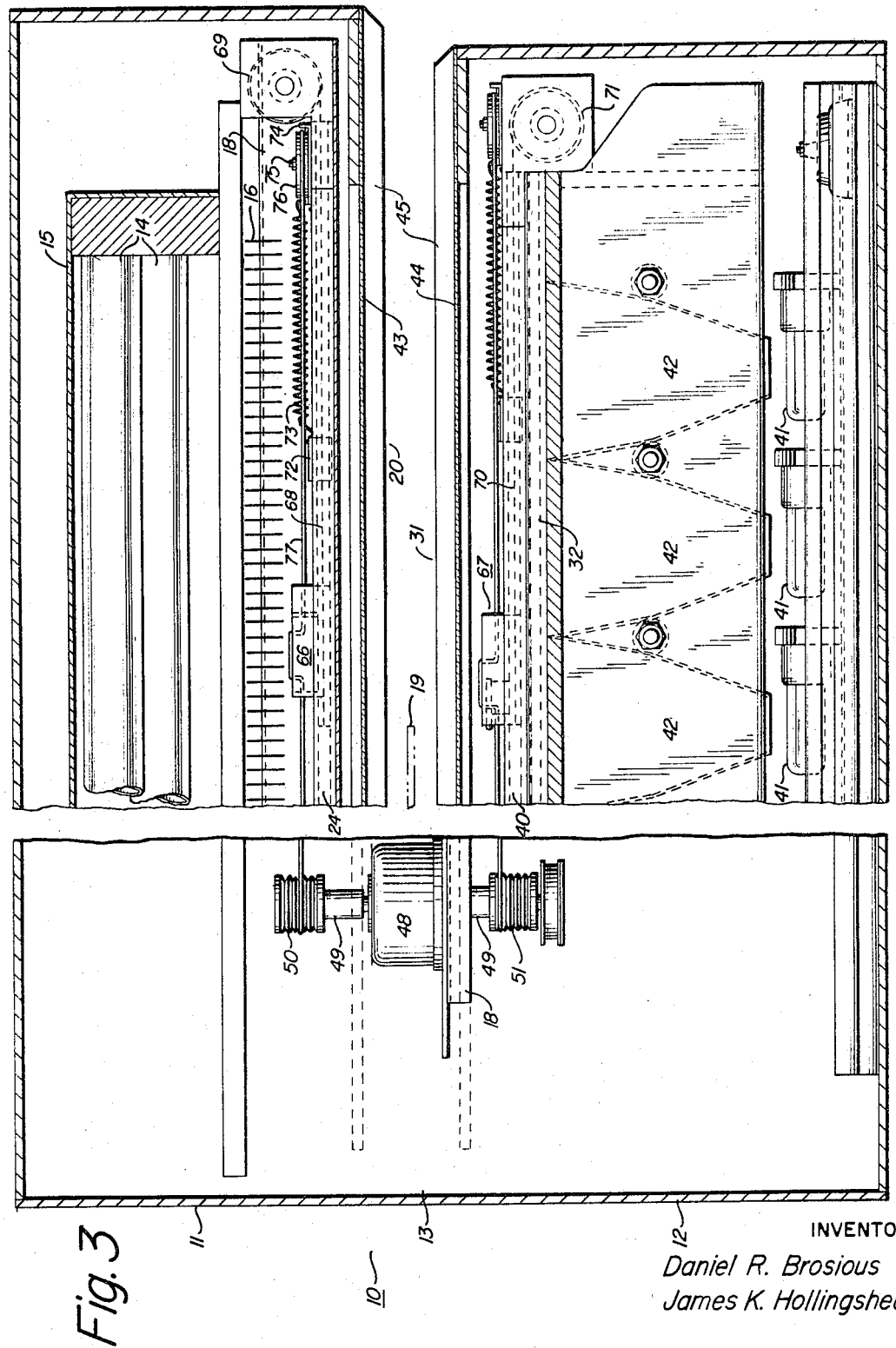

Each motor control circuit supplies power to reversible motive power means, e.g. D.C. torque motor 48, housed in supporting member 13 and shown in FIGURES 3, 4 and 5. The shaft 49 of motor 48 is connected to upper and lower threaded drums 50 and 51, respectively. Variations in the intensity of the light impinging upon one of the photoresistive cells result in rotation of shaft 49.

Photoresistive cell 46 is included in the motor control circuit which supplies power to D.C. torque motor 52, also housed in supporting member 13. The shaft 53 of motor 52 is connected to upper and lower threaded drums 54 and 55, respectively.

Mounted on the slotted guide 25 is a bracket 56 to which a spring 57 is attached. The spring 57 is connected to a pulley 58. A cable 59 mechanically links the pulley 58 with the upper drum 54. The cable 59 is attached to guide block 29. Rotation of the armature 53 thus results in the rectilinear motion of shield 21 lengthwise of the aperture 20.

The film 30 is wound about a roller 60 which maintains tension in the film by means of a spring motor housed within said roller.

Mounted on the slotted guide 39 is a bracket 61 to which a spring 62 is attached. The spring 62 is connected to a pulley 63. A cable 64 mechanically links the pulley 63 to the lower drum 55. The cable 64 is attached to guide block 37. Rotation of the armature 53 thus results in the rectilinear motion of shield 33 lengthwise of the aperture 31 in the synchronism with shield 21.

The film 38 is wound about a roller 65 which maintains tension in the film by means of a spring motor housed within said roller.

The motor 48 drives the shields of the shielding means disposed adjacent the other edge of the strip. Said shielding means is similar in construction to the above-described shielding means and therefore will be described only briefly. Said shielding means comprises an upper shield 66 and a lower shield 67. Shield 66 is connected to a flexible film 68 wound about a roller 69. Shield 67 is connected to a flexible film 70 wound about a roller 71.

Mounted on the slotted guide 25 is a bracket 72 to which a spring 73 is attached. As shown in FIGURES 5 and 5A the spring 73 is connected to a plate 74, pivotally mounted at its center by means of a bolt and nut 75, on which plate a pulley 76 is mounted. A cable 77 mechanically links the pulley 76 with the upper drum 50. The cable 77 is connected to the shield 66 whereby rotation of the armature 49 results in the rectilinear motion of shield 66 lengthwise of the aperture 20.

The lower shield 67 and film 70 are similarly mechanically linked to the lower drum 51 whereby shield 67 is driven lengthwise of aperture 31 in synchronism with shield 66.

The operation of the shielding means will now be described. Inasmuch as each shielding means functions in substantially the same manner, only one will be dealt with.

Assuming that the shielding means is in its retracted position, i.e. in its furthermost position away from an edge of the strip 19, the light emitted by the photoluminescent louvers 16 passes through the filter plate 22 and impinges upon the photoresistive cell 46. The relatively high intensity of said light causes the motor control circuit, the operation of which will be described in detail later in the specification, to supply power to motor 52 which results in inward motion of shields 21 and 33. The inward motion of said shields ceases when the intensity of the light impinging upon cell 46 decreases to a predetermined equilibrium value, which occurs when the edge of the strip 19 is interposed between said shields and cell 46 is only partially illuminated.

When the intensity of the light impinging upon cell 46 is at equilibrium, the motor control circuit supplies power to motor 52 which results in no development of torque, and the positions of shields 21 and 33 thus remain fixed with respect to the edge of the strip 19. Should the intensity of the light impinging upon cell 46 momentarily vary from the equilibrium value due to lateral motion of the strip and/or variations in the width thereof, the resistance of cell 46 varies from its value at equilibrium. The motor control circuit then causes motor 52 to develop a torque in the direction which results in the re-positioning of shields 21 and 33 with respect to the edge of strip 19 until the intensity of the light impinging upon cell 46 is again at equilibrium.

A limit switch 78 and a mechanical stop, not shown in the mechanical drawings, are provided for each light-shielding means to limit outward motion of the shields.

Figure 6:
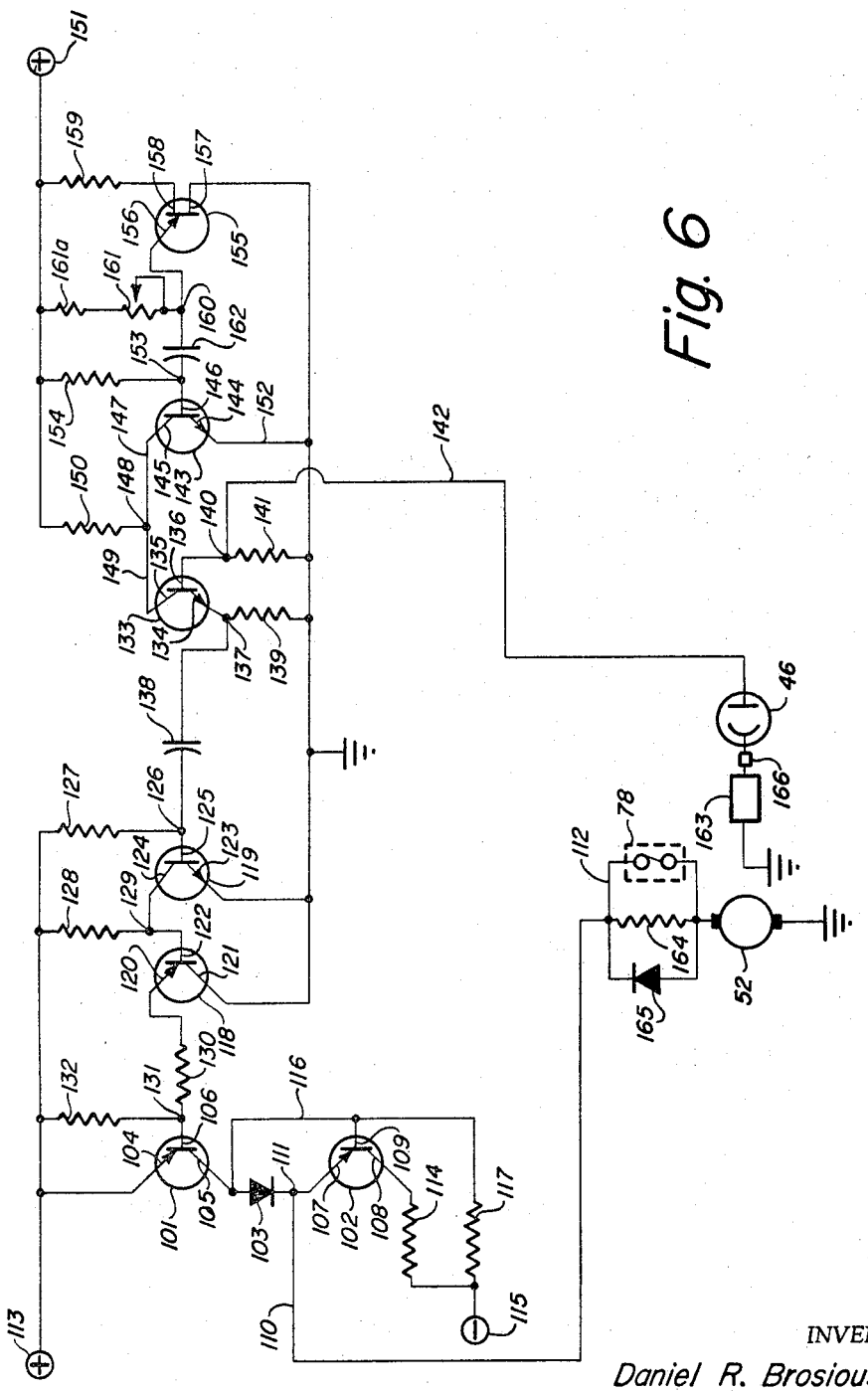
FIGURE 6 is a schematic of a motor control circuit.

The motor control circuit, shown in FIGURE 6, broadly comprises the four following functional circuits: (1) an output power stage; (2) driver or amplifier stages; (3) a height to width converter; (4) a pulse generator. The output power stage comprises power transistors 101 and 102 and a junction diode 103. Transistor 101 is of the p-n-p type and has an emitter electrode 104, a collector electrode 105, and a base electrode 106. Transistor 102 is also of the p-n-p type and has an emitter electrode 107, a collector electrode 108, and a base electrode 109. Transistors 101 and 102 function like a pair of interlocked single pole switches connected so that when one switch is open, the other switch is closed. That is, when transistor 101 is in saturated conduction, transistor 102 is cut off, and vice versa. A conductor 110 connects the junction 111 of diode 103 and the emitter 107 of transistor 102 to conductor 112 and, assuming limit switch 78 is closed, to one side of the motor 52, the other side of the motor being connected to ground. Connected in parallel with limit switch 78 is a resistor 164 and a junction diode 165. Connected to the emitter 104 of transistor 101 is a source 113 of positive D-C potential, e.g. +24 volts. Connected through load resistor 114 to the collector 108 of transistor 102 is a source 115 of negative D-C potential equal in magnitude to that of source 113, e.g. −24 volts.

If it is assumed that transistor 101 is initially in saturated conduction, current flows from positive source 113 through transistor 101. The collector current leaves the collector 105 and flows substantially unimpeded through diode 103, which is forward biased by the collector current from transistor 101, to junction 111. The base 109 of transistor 102 is connected to the positive side of diode 103 by conductor 116 and the emitter 107 is connected to the negative side thereof, so that the small voltage drop across the diode 103 when the saturated collector current of transistor 101 flows therethrough suffices to reverse bias transistor 102 beyond cut-off.

If transistor 101 is cut off, only leakage current flows in the base circuit thereof, and the collector current is quite small. The voltage drop across diode 103 is therefore negligible, and transistor 102 is no longer reverse biased. Sufficient current is supplied to the base 109 through resistor 117 to drive transistor 102 into saturation.

The operation of the output power stage is predicated upon the low forward impedance of junction diodes and the switching properties of transistors, as is well known in the art. That is, both a forward biased junction diode and a transistor in saturated conduction may be considered substantially short circuits. Thus, when transistor 101 is in saturated conduction and transistor 102 is cut off, current flows substantially unimpeded from positive source 113 through transistor 101 and diode 103 directly into motor 52, and the positive D-C voltage at source 113 is, for all practical purposes, directly across said motor. Similarly, when transistor 101 is cut off and transistor 102 is in saturated conduction, current flows substantially unimpeded from motor 52 through transistor 102 into negative source 115, and the negative D-C voltage at source 115 is, for all practical purposes, directly across said motor. Since transistors 101 and 102 are interlocked, power is continuously supplied to motor 52.

Figure 7G:
FIGURES 7A–7I show graphically the wave forms of the voltages at various points in the circuit.
Figure 7H:
Figure 7I:
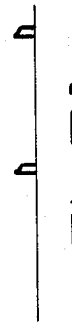
Figure 7D:
Figure 7E:
Figure 7F:
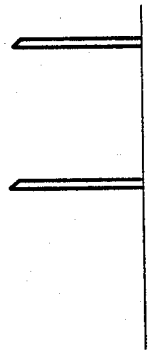
Figure 7A:
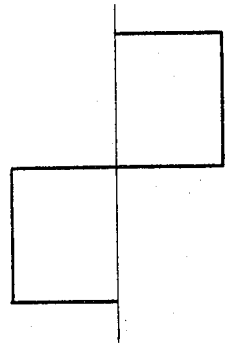
Figure 7B:
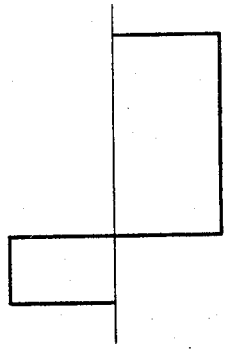
Figure 7C:
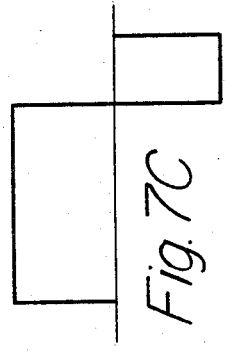

Transistors 101 and 102 are alternately driven into saturation at a predetermined frequency, e.g. 500 cycles per second. If each transistor is driven into saturated conduction for 50% of each cycle, the positive and negative D-C voltage sources 113 and 115 are alternately placed across the motor 52 for equal periods of time by the switching action of said transistors. Provided the frequency of switching is sufficiently high, the shaft 53 of motor 52 will not rotate, since the torque developed is of insufficient magnitude to overcome the mechanical inertia of the motor and its load. The equilibrium condition, i.e. the condition in which the transistors 101 and 102 are driven into saturated conduction for 50% of each cycle, occurs when the shields 21 and 33 are properly positioned with respect to the edge of the moving strip 19 as determined by the intensity of the light impinging upon the photoresistive cell 46. The voltage waveform across the motor at equilibrium is shown graphically in FIGURE 7(A). Should the shields 21 and 33 be momentarily improperly positioned, light of a greater or lesser intensity will impinge upon the photoresistive cell 46, and transistors 101 and 102 will no longer be in saturated conduction for 50% of each cycle. FIGURES 7(B) and 7(C) show the voltage waveform across the motor 52 during such non-equilibrium conditions. During non-equilibrium conditions, one of the D-C voltage sources 113 and 115 is across the motor for a majority of each cycle, and a net torque is developed by the motor 52 which causes the shaft 53 to rotate in such a direction that the shields 21 and 33 are re-positioned in their proper position with respect to the edge of the strip. The direction and magnitude of the torque developed depend upon the intensity of the light impinging upon the photoresistive cell 46.

The driver or amplifier stages comprise p-n-p transistor 118 and n-p-n transistor 119 and serve to reverse bias transistor 101 in response to an input control signal dependent upon the resistance of cell 46. Transistor 118 has an emitter electrode 120, a collector electrode 121, and a base electrode 122. Transistor 119 has an emitter electrode 123, a collector electrode 124, and a base electrode 125. Transistors 119, 118, and 101 are directly coupled to each other so that when transistor 119 is in saturated conduction, transistors 118 and 101 are in saturated conduction, also. Similarly, when transistor 119 is cut off, transistors 118 and 101 are cut off, also. In other words, the state of conduction of transistor 119 determines the state of conduction of transistors 118, 101, and, because transistors 101 and 102 are interlocked, 102.

The base 125 of transistor 119 is connected to junction 126. In the absence of a negative potential at junction 126, transistor 119 is in saturated conduction due to the current supplied to its base 125 through resistor 127. Current then flows from source 113 through resistor 128 and through transistor 119 to ground. The base 122 of transistor 118 is connected to resistor 128 at junction 129. The voltage drop across resistor 128 when transistor 119 is in saturated conduction causes the potential at junction 129 to become less positive, and thereby provides forward bias to transistor 118. The collector 124 of transistor 119 supplies sufficient base current to the base 122 of transistor 118 to drive it into saturated conduction. Connected between the emitter 120 of transistor 118 and the base 106 of transistor 101 is a current limiting resistor 130, which limits the emitter current of the transistor 118 to a safe value. At the junction 131 of resistor 130 and base 106, a resistor 132 is connected to source 113. Current from source 113 is conducted through resistors 132 and 130 through transistor 118 to ground. The voltage drop across resistor 132 when transistor 118 is in saturated conduction causes the potential at junction 131 to become less positive, and thereby provides sufficient forward bias to transistor 101 to drive it into saturated conduction. As previously explained, transistor 102 is cut off when transistor 101 is in saturated conduction.

A negative potential at junction 126 suffices to reverse bias transistor 119 beyond cut off. The potential at junction 129 then becomes more positive, inasmuch as there is a very small voltage drop across resistor 128 when transistor 119 is cut off. This increase in potential at junction 129 cuts off transistor 118. The potential at junction 131 then becomes more positive, inasmuch as the voltage drop across resistor 132 is very small when transistor 118 is cut off. The increase in potential at junction 131 cuts off transistor 101, thereby permitting transistor 102 to be driven into saturated conduction.

It can be seen from the foregoing that the presence of a negative potential at junction 126 for 50% of each cycle causes the sources of positive and negative potential 113 and 115, respectively, to be alternately placed across the armature of motor 52 for equal periods of time. Such a condition prevails when the shields 21 and 33 are properly positioned with respect to the edge of the strip 19, and no torque is developed by the motor 52. Furthermore, it can be seen that by varying the percentage of each cycle during which a negative potential is present at junction 126, either the positive source 113 or the negative source 115 will be placed across the motor 52 for more than 50% of each cycle. This condition prevails when the shields 21 and 33 are improperly positioned, and a net torque is developed by the motor 52 which re-positions the shields 21 and 33 in their proper position with respect to the edge of the strip 19.

The resistance of the photoresistive cell 46, which is dependent upon the intensity of the light impinging upon it, determines the percentage of each cycle during which a negative potential is present at junction 126 by means of circuits now to be described. An n-p-n transistor 133 has an emitter electrode 134, a collector electrode 135, and a base electrode 136. The emitter 134 is connected to junction 137, and a capacitor 138 is connected between junction 137 and 126. A load resistor 139 is connected between junction 137 and ground. Connected to the base 136 at a junction 140 is a leak resistor 141. The photoresistive cell 46 is connected to junction 140 by conductor 142.

An n-p-n transistor 143 having an emitter electrode 144, a collector electrode 145, and a base electrode 146 has its collector 145 connected by conductor 147 to a junction 148 which is connected to collector 135 of transistor 133 by conductor 149. A resistor 150 is connected between junction 148 and a source 151 of regulated positive D-C potential, e.g. +24 volts. The emitter 144 of transistor 143 is connected to ground by conductor 152. Connected to the base 146 of transistor 143 at junction 153 is a resistor 154 which connects the base 146 to source 151.

A unijunction transistor 155 having an emitter electrode 156 and first and second base electrodes 157 and 158, respectively, has its base 157 connected to ground and its base 158 connected to source 151 through resistor 159. At a junction 160 is a potentiometer 161 connected in series with a resistor 161a, whereby the emitter 156 is connected to source 151. Connected between junctions 160 and 153 is a capacitor 162.

The operation of the circuits is substantially as follows. The unijunction transistor 155 operates in conjunction with potentiometer 161, resistor 161a, and capacitor 162 to produce a sawtooth wave voltage, shown in FIGURE 7(D), at junction 160. As is well known in the art, the interbase resistance of unijunction transistor 155 is dependent upon its emitter current. This resistance is very high until the voltage between the emitter 156 and the base 158 reaches a "firing potential," which is approximately two-thirds the voltage between base 157 and base 158, at which time the emitter current flows, and the resistance of base 157 rapidly decreases to a low value. As the resistance of base 157 decreases, the voltage at the emitter 156 also decreases until it is below a minimum or cut-off value, at which time base 157 returns to its high resistance state and the emitter current ceases to flow.

If it is assumed that the power is just turned on, negligible current flows through unijunction transistor 155, since the voltage at its emitter 156 is zero. The emitter voltage increases as capacitor 162 charges through potentiometer 161, resistor 161a, and the base-emitter circuit of transistor 143. During this portion of the cycle, i.e. the time during which the voltage at junction 160 is increasing, the charging current through the base-emitter circuit of transistor 143 provides sufficient forward bias to maintain transistor 143 in saturated conduction. Junction 153 is essentially at ground potential, since the voltage drop from the base 146 to the emitter 144 is negligible during saturation. When the voltage at the emitter 156 reaches the firing potential, the resistance of base 157 rapidly decreases to a low value, and the positive charge stored in capacitor 162 rapidly discharges through the emitter 156 and base 157 to ground until the emitter voltage decreases to below the cut-off value.

Inasmuch as the voltage across a capacitor cannot change instantaneously and the voltage at junction 160 has decreased almost instantaneously, the voltage at junction 153 must instantaneously decrease an equal amount. Because the voltage at junction 153 was approximately at ground potential during the charging cycle of capacitor 162, it must decrease below ground potential at the start of the discharging cycle of capacitor 162. The negative voltage at junction 153 cuts off transistor 143 until said voltage can discharge, the discharge time being primarily a function of capacitor 162 and resistor 154. The value of resistor 154 should be such that transistor 143 is cut off for about 10% of each cycle, although other values may, of course, be permissible. The waveform of the voltage at junction 153 is shown in FIGURE 7(E).

As previously pointed out, when transistor 143 is in saturated conduction the voltage drop across it is negligible. Since transistor 133 is in series with resistor 139 and the combination is in parallel with transistor 143, transistor 133 and resistor 139 are shorted out during that period of each cycle during which transistor 143 is in saturated conduction. When transistor 143 is cut off, the voltage at junction 148 is nearly equal to that of the source 151, and current may flow through transistor 133. The waveform of the voltage at junction 148 is shown in FIGURE 7(F).

The photoresistive cell 46 is connected to an adjustable voltage supply, broadly designated as 163, which is adjusted to cause the photoresistive cell to supply adequate forward bias through conductor 142 to the base 136 of transistor 133 when the cell is fully illuminated. When the system is operating, the base bias varies from a few microamperes to about two hundred microamperes at full illumination. The magnitude of the current through transistor 133 is modulated by the magnitude of the base bias. From the foregoing discussion, it can be seen that the voltage at junction 137 is a series of narrow pulses, each having an amplitude dependent upon the intensity of the light impinging upon the photoresistive cell 46. The waveform of this voltage is shown in FIGURES 7(G), (H) and (I) for three different intensities of light. FIGURE 7(G) shows the voltage when the light intensity is relatively large. FIGURE 7(H) shows the voltage at the equilibrium light intensity, and FIGURE 7(I) shows the voltage when the light intensity is relatively small.

Transistor 119, which was previously considered in the driver stages, operates in conjunction with capacitor 138 and transistor 133 to convert the pulses of varying amplitude and constant width at junction 137 to pulses of varying width and constant amplitude at junction 131. When a pulse arrives at junction 137 the capacitor 138 rapidly charges through resistor 150, transistor 133, and the base-emitter circuit of transistor 119. Inasmuch as transistor 119 is in saturated conduction by reason of the forward bias supplied to its base 125 through resistor 127, junction 126 remains at approximately ground potential. When the trailing edge of the pulse arrives, i.e. when transistor 133 is cut off by the short-circuiting action of transistor 143, the current through resistor 139 decreases instantaneously to a value determined by the impedance of the discharging circuit of capacitor 138, i.e. the series impedance of resistor 127, capacitor 138, and resistor 139. The resistance of resistor 127 is large compared to that of resistor 139, and the voltage at junction 137 therefore decreases instantaneously to a value slightly above ground potential. Inasmuch as the total voltage across capacitor 138 cannot change instantaneously, the voltage at junction 126, which was previously slightly above ground potential, must instantaneously decrease by an amount equal to the decrease in voltage at junction 137. The voltage at junction 126 thus becomes negative until capacitor 138 can discharge through resistors 127 and 139.

The negative voltage at junction 126 suffices to reverse bias transistor 119 beyond cut-off. The percentage of each cycle during which transistor 119 is cut off depends upon the magnitude of the voltage at junction 126, which in turn depends upon the magnitude of the voltage at junction 137. The latter voltage depends upon the emitter current of transistor 133, which is dependent upon the intensity of the light impinging upon the photoresistive cell 46. The values of resistor 127 and capacitor 138 are chosen so that when the cell 46 is fully illuminated the RC time constant is long enough to keep transistor 119 reverse biased beyond cut-off until another pulse arrives at the emitter 134 of transistor 133. With less than maximum illumination of cell 46, transistor 119 is cut off for a proportionately shorter period of time. For example, when the illumination is such that the equilibrium value of output current flows from the cell, i.e. when the shields 21 and 33 are properly positioned with respect to the edge of the strip 19, transistor 119 is reverse biased beyond cut-off for 50% of each cycle.

The motor 52 is connected to the motor control circuit so that when a positive potential is placed across its armature due to the conduction of transistor 101, the shaft 53 tends to rotate in a direction which would cause the shields 21 and 33 to be driven outwardly, i.e. away from the strip. When a negative potential is placed across its armature due to the conduction of transistor 102, the shaft 53 tends to rotate in a direction which would cause the shields 21 and 33 to be driven inwardly, i.e. toward the strip.

The photoresistive cell 46 is provided with power by an adjustable power supply 163. Between the cell and power supply 163 is a relay 166 which may be manually opened to de-energize the cell.

Prior to operating the device, voltage supply 163 is adjusted so that there is no output current from the photoresistive cell 46. The system is now energized, and the shields 21 and 33 are immediately driven to their fully retracted position inasmuch as there is no input signal to prevent transistor 101 from conducting, and thereby placing a positive potential across the armature of motor 52, for the entire cycle. This extreme outward movement of the shields results in the opening of limit switch 78, switching the parallel combination of junction diode 165 and resistor 164 into the circuit. The high impedance of the diode 165, which is reverse biased, and resistor 164 decreases the armature current to a value of insufficient magnitude to cause further rotation of the shaft 53 of motor 52.

The voltage supply 163 is now adjusted to increase the current through the cell 46. The increasing current results in the reverse biasing of transistor 101 for a portion of each cycle. During that portion of the cycle in which transistor 101 is reverse biased a negative potential is placed across the armature of motor 52. Inasmuch as diode 165 is then forward biased, the armature current is relatively unimpeded, and sufficient torque is developed by motor 52 to drive the shields 21 and 33 inwardly and thereby close limit switch 78. The voltage supply 163 is further adjusted until the cell 46 is supplying sufficient current to advance the shields to the edge of the strip 19 without any oscillatory motion of the shields.

After voltage supply 163 has been adjusted, relay 166 is opened and the shields 21 and 33 are driven to their fully retracted position. To begin inspection of the strip 19, relay 166 is closed, thereby closing the photoresistive cell circuit. Inasmuch as the cell 46 is fully exposed to the light emitted by the louvers 16, a large output current flows from cell 46 to the base 136 of transistor 133. The current impulses at junction 137 are therefore very large, and the voltage drop at junction 126 when the trailing edge of the pulse arrives at junction 137 is sufficient to cut off transistor 101 for the entire cycle. Transistor 102 is therefore in saturated conduction for the entire cycle, and the negative potential of source 115 is across the armature of motor 52 for the entire cycle. The shaft 53 of motor 52 develops a high torque which drives the shields 21 and 33 inwardly until a portion of the cell 46 is no longer illuminated by light from the louvers 16. Movement of the shields stops when the output current from cell 46 is just sufficient to result in the reverse biasing of transistor 101 beyond cut-off for 50% of each cycle.

As the intensity of the light impinging upon the photoresistive cell 46 varies due to lateral motion of the strip 19 and variations in the width thereof, the output current from cell 46 varies correspondingly and the motor control circuit supplies power to motor 52 to re-position the shields 21 and 33 accurately with respect to the edge of the strip.

The following components may be utilized in the circuit shown in FIGURE 6.

| | |
|---|---|
| Resistor 114 | 5 ohms. |
| Resistor 117 | 125 ohms. |
| Resistor 127 | 100K ohms. |
| Resistor 128 | 4.7K ohms. |
| Resistor 130 | 270 ohms. |
| Resistor 132 | 15 ohms. |
| Resistor 139 | 10K ohms. |
| Resistor 141 | 150K ohms. |
| Resistor 150 | 2.2K ohms. |
| Resistor 154 | 4.7K ohms. |
| Resistor 159 | 330 ohms. |
| Potentiometer 161 | 25K ohms. |
| Resistor 161a | 25K ohms. |
| Resistor 164 | 40 ohms. |
| Capacitor 138 | .1 mfd. |
| Capacitor 162 | .05 mfd. |
| Diodes 103, 165 | Type 40-H |
| Transistors 101, 102 | Type 2N1970 |
| Transistor 118 | Type 2N1125 |
| Transistors 119, 133, 143 | Type 2N1711 |
| Transistor 155 | Type 2N1761 |

It is to be understood that the values for the circuit components may vary according to the design for any particular application. The foregoing specifications were given for the purpose of example only, and are suitable for a control circuit supplying 500 pulses per second.

The aforementioned motive power means utilized to drive the shields 21 and 33 should preferably be a D-C torque motor. Because of the high output torque to inertia ratio that is possible, and also because of the small input power required to obtain a given torque, such a motor is ideally suited for use in the instant device. A further advantage lies in the very fast torque vs. time response inherent in D-C torque motors.

Pinhole detectors of the invention can be easily inserted into or withdrawn from a threaded strip line. The physical length of said detectors is up to 50% less than that of prior detectors by reason of the novel light-shielding means incorporated therein. Said light-shielding means are thus light in weight and are thus highly responsive to variations in strip width and lateral movement of strip. Furthermore, because of their wide, deep, throat sections, there is no possibility of damage to the light-shielding means by reason of contact with the strip.

We claim:

1. Apparatus for detecting light transmission through moving strip, comprising:
  (a) a housing having an upper chamber containing a source of light and a lower chamber containing light-sensitive means, said chambers having confronting slotted apertures extending transverse to the direction of strip travel,
  (b) light-shielding means, positioned adjacent each edge of the strip, comprising a first shield, adapted to prevent transmission of light from said source, disposed across a portion of the aperture in said upper chamber, a second shield, adapted to prevent transmission of light, disposed across a portion of the aperture in said lower chamber, and a flexible film of non-light-transmitting material connected to each shield and disposed across that portion of the aperture extending outwardly of the shield, (c) means, mounted in said housing, for maintaining each of said films in tension, said means comprising a roller about which said film is wound, (d) means associated with said light-shielding means for producing an electrical signal which varies with the position of said shields with respect to the adjacent edge of said strip, (e) reversible motive power means connected to said first and second shields whereby said shields can be synchronously driven lengthwise of said apertures, and (f) means supplying said signal to said reversible motive power means to control the direction and extent of movement of said shields whereby the position of said shields is maintained constant with respect to the adjacent edge of the strip.

2. Apparatus for detecting light transmission through moving strip, comprising:

(a) a substantially C-shaped housing having an upper chamber containing a source of light, a lower chamber containing light-sensitive means, and a supporting member interconnecting said chambers at one end thereof, said chambers having confronting slotted apertures extending transverse to the direction of strip travel, (b) light-shielding means, positioned adjacent each edge of the strip, comprising a first shield, adapted to prevent transmission of light from said source, disposed across a portion of the aperture in said upper chamber, a second shield, adapted to prevent transmission of light, disposed across a portion of the aperture in said lower chamber, and a flexible film of non-light-transmitting material connected to each shield and disposed across that portion of the aperture extending outwardly of the shield, (c) means, mounted in said housing, for maintaining each of said films in tension, said means comprising a roller about which said film is wound, (d) means associated with said light-shielding means for producing an electrical signal which varies with the position of said shields with respect to the adjacent edge of said strip, (e) first and second reversible motive power means mounted in proximity to said supporting member, (f) means connecting said first reversible motive power means to the light-shielding means adjacent one edge of the strip and said second reversible motive power means to the light-shielding means adjacent the other edge of the strip whereby the upper and lower shields of each light-shielding means can be synchronously driven lengthwise of said apertures, and (g) means supplying each of said signals to the reversible motive power means associated therewith to control the direction and extent of movement of said shields whereby the positions of said shields are maintained constant with respect to the edges of the strip.

3. Apparatus for detecting light transmission through moving strip, comprising:

(a) a housing having an upper chamber containing a source of light within a first frequency range and a lower chamber containing first light-sensitive means, said chambers having confronting slotted apertures extending transverse to the direction of strip travel, (b) light-shielding means, positioned adjacent each edge of the strip, comprising a first shield, adapted to prevent transmission of light from said source, disposed across a portion of the aperture in said upper chamber, a second shield, adapted to prevent transmission of light, disposed across a portion of the aperture in said lower chamber, and a flexible film of non-light-transmitting material connected to each shield and disposed across that portion of the aperture extending outwardly of the shield, (c) means disposed below said source and above said first shields for converting to light within a second frequency range light within said first frequency range emitted from said source toward said strip in planes non-coplanar with planes substantially perpendicular to the surface of the strip and parallel to the direction of strip travel, (d) means disposed across the aperture in said lower chamber for transmitting only light within said first frequency range, (e) said first shield comprising means for transmitting only light within said second frequency range, (f) second light-sensitive means positioned on said second shield, (g) a control circuit, including said second light-sensitive means, which produces an electrical signal which varies as the intensity of the light impinging upon said second light-sensitive means varies, (h) reversible motive power means, (i) means connecting said reversible motive power means to said shields whereby said shields can be synchronously driven lengthwise of said apertures, and (j) means supplying said signal to said reversible motive power means to control the direction and extent of movement of said shields whereby the position of said shields is maintained constant with respect to the adjacent edge of the strip.

4. Apparatus as recited in claim 1, including means mounted in said housing for maintaining each of said films in tension, said means comprising a roller about which said film is wound.

5. Apparatus for detecting light transmission through moving strip, comprising:

(a) a housing having an upper chamber containing a source of light within a first frequency range and a lower chamber containing first light-sensitive means, said chambers having confronting slotted apertures extending transverse to the direction of strip travel, (b) light-shielding means, positioned adjacent each edge of the strip, comprising a first shield, adapted to prevent transmission of light from said source, disposed across a portion of the aperture in said upper chamber, a second shield, adapted to prevent transmission of light, disposed across a portion of the aperture in said lower chamber, and a flexible film of non-light-transmitting material connected to each shield and disposed across that portion of the aperture extending outwardly of the shield, (c) means mounted in each housing for maintaining each of said films in tension, said means comprising a roller about which said film is wound, (d) a plurality of substantially equidistantly spaced louvers disposed below said source and above said first shields, each of said louvers being disposed in a plane substantially perpendicular to the plane of the strip and parallel to the direction of strip travel, (e) said louvers being characterized by the property of absorbing light within said first frequency range and, in response to said absorbed light, emitting light within a second frequency range, (f) means disposed across the aperture in said lower chamber for transmitting only light within said first frequency range, (g) said first shield comprising means for transmitting only light within said second frequency range, (h) second light-sensitive means positioned on said second shield, (i) a control circuit, including said second light-sensitive means, which produces an electrical signal which varies as the intensity of the light impinging upon said second light-sensitive means varies, (j) reversible motive power means, (k) means connecting said reversible motive power means to said first and second shields whereby said shields can be synchronously driven lengthwise of said apertures, and (l) means supplying said signal to said reversible motive power means to control the direction and extent of movement of said shields whereby the position of said shields is maintained constant with respect to the adjacent edge of the strip.

6. Apparatus for detecting light transmission through moving strip, comprising:

(a) a substantially C-shaped housing having an upper chamber containing a source of light within a first frequency range, a lower chamber containing first light-sensitive means, and a supporting member interconnecting said chambers at one end thereof, said chambers having confronting slotted apertures extending transverse to the direction of strip travel, (b) light-shielding means, positioned adjacent each edge of the strip, comprising a first shield, adapted to prevent transmission of light from said source, disposed across a portion of the aperture in said upper chamber, a second shield, adapted to prevent transmission of light, disposed across a portion of the aperture in said lower chamber, and a flexible film of non-light-transmitting material connected to each shield and disposed across that portion of the aperture extending outwardly of the shield, (c) means, mounted in said housing, for maintaining each of said films in tension, said means comprising a roller about which said film is wound, (d) a plurality of substantially equidistantly spaced louvers disposed below said source and above said first shields, each of said louvers being disposed in a plane substantially perpendicular to the plane of the strip and parallel to the direction of strip travel, (e) said louvers being characterized by the property of absorbing light within said first frequency range and, in response to said absorbed light, emitting light within a second frequency range, (f) means disposed across the aperture in said lower chamber for transmitting only light within said first frequency range, (g) said first shield comprising means for transmitting only light within said second frequency range, (h) second light-sensitive means positioned on said second shield, (i) a control circuit, including said second light-sensitive means, which produces an electrical signal which varies as the intensity of the light impinging upon said second light-sensitive means varies, (j) first and second reversible motive power means mounted in proximity to said supporting member, (k) means connecting said first reversible motive power means to the light-shielding means adjacent one edge of the strip and said second reversible motive power means to the light-shielding means adjacent the other edge of the strip whereby the upper and lower shields of each light-shielding means can be synchronously driven lengthwise of said apertures, and (l) means supplying said signal to said reversible motive power means to control the direction and extent of movement of said shields whereby the positions of said shields are maintained constant with respect to the edges of the strip.

7. Apparatus as recited in claim 6, in which means is interposed between means (f) and said first light-sensitive means so that light entering said lower chamber in directions substantially perpendicular to the surface of said strip is directed toward said first light-sensitive means and light entering said lower chamber in directions substantially nonperpendicular to said strip surface is reflected out of said lower chamber.

8. Apparatus as recited in claim 6 in which a plurality of light funnels, each comprising at least four plane reflective surfaces, is interposed between means (f) and said first light-sensitive means.

References Cited

UNITED STATES PATENTS

| Re. 25,671 | 10/1964 | Larew et al. | 250—219 |
| 3,125,682 | 3/1964 | Linderman et al. | 88—14 X |
| 3,128,385 | 4/1964 | Scharf et al. | 250—219 |
| 3,240,945 | 3/1966 | Dixon | 250—219 |
| 3,255,356 | 6/1966 | Brosious et al. | 250—219 |

WALTER STOLWEIN, Primary Examiner.

U.S. Cl. X.R.

88—14

UNITED STATES PATENT OFFICE
CERTIFICATE OF CORRECTION

Patent No. 3,422,272                          January 14, 1969

Daniel R. Brosious et al.

It is certified that error appears in the above identified patent and that said Letters Patent are hereby corrected as shown below:

Column 12, line 39, claim reference numeral "4" should read -- 3 --.

Signed and sealed this 17th day of March 1970.

(SEAL)
Attest:

Edward M. Fletcher, Jr.                      WILLIAM E. SCHUYLER, JR.
Attesting Officer                              Commissioner of Patents

UNITED STATES PATENT OFFICE
CERTIFICATE OF CORRECTION

Patent No. 3,422,272                                  January 14, 1969

Daniel R. Brosious et al.

It is certified that error appears in the above identified patent and that said Letters Patent are hereby corrected as shown below:

Column 12, line 39, claim reference numeral "1" should read -- 3 --.

This certificate supersedes Certificate of Correction issued March 17, 1970.

Signed and sealed this 2nd day of June 1970.

(SEAL)
Attest:

Edward M. Fletcher, Jr.                        WILLIAM E. SCHUYLER, JR.

Attesting Officer                                 Commissioner of Patents